United States Patent [19]
Eckart et al.

[11] Patent Number: 6,025,069
[45] Date of Patent: *Feb. 15, 2000

[54] THERMOPLASTIC ARTICLE HAVING HIGH-RELIEF SURFACE

[75] Inventors: Michael Dennis Eckart, Blountville, Tenn.; Raymond Lynn Goodson, Sandy, Utah

[73] Assignee: Eastman Chemical Company, Kingsport, Tenn.

[*] Notice: This patent is subject to a terminal disclaimer.

[21] Appl. No.: 09/100,219

[22] Filed: Jun. 19, 1998

Related U.S. Application Data

[60] Provisional application No. 60/057,348, Aug. 26, 1997.
[51] Int. Cl.$^7$ ..................................................... B32B 27/18
[52] U.S. Cl. ........................... 428/339; 428/332; 428/354; 523/171; 528/272; 528/302; 528/307; 528/308
[58] Field of Search ..................................... 428/339, 332, 428/354; 523/171; 528/272, 302, 307, 308

[56] References Cited

U.S. PATENT DOCUMENTS 5,643,666    7/1997    Eckart et al. .

FOREIGN PATENT DOCUMENTS

| 0 408 042 A2 | 1/1991 | European Pat. Off. . |
| 0 595 413 A1 | 5/1994 | European Pat. Off. . |
| WO 94 25502 A1 | 11/1994 | WIPO . |

OTHER PUBLICATIONS

Patent Abstracts of Japan, vol. 097, No. 006, Jun. 30, 1997 & JP 09 052338 A (Kanebo Ltd.), Feb. 25, 1997. See abstract.

U. S. Application Serial No. 09/096,969 Filed Jun. 12, 1998, Entitled "Thermoplastic Article Having Textile Fiber Fabric Embedded Therein" by Michael Dennis Eckart and Raymond Lynn Goodson.

U. S. Application Serial No. 09/096,970 Filed Jun. 12, 1998, Entitled "Thermoplastic Article Having Metallic Wire, Rod or Bar Embedded Therein" by Michael Dennis Eckart and Rayamond Lynn Goodson.

*Primary Examiner*—Richard Weisberger
*Attorney, Agent, or Firm*—Cheryl J. Tubach; Harry J. Gwinnell

[57] ABSTRACT

Disclosed is a novel thermoplastic article having a high-relief, molded or embossed surface produced by contacting a laminate comprising a first or outer copolyester sheet material and a second or backing copolyester sheet material with heat and pressure using a heated element which simultaneously causes the material to be bonded and a high-relief, decorative appearance to be produced on at least one surface of the thermoplastic article. Also disclosed is an embossed or molded, bonded laminate comprising, in order, (1) a first or outer copolyester layer, (2) a second layer comprising a film which is colored or which bears an image or pattern, and (3) a third or backing copolyester layer, wherein the first and third layers are composed on the above-described copolyester. The copolyesters of the thermoplastic articles and laminates are selected from copolyesters having an inherent viscosity of 0.5 to 1.2 dL/g, when measured at 25° C. using 0.50 grams of polymer per 100 mL of a solvent consisting of 60 weight percent phenol and 40 weight percent tetrachloroethane, comprising (i) diacid residues comprising at least 80 mole percent terephthalic acid residues; and (ii) diol residues comprising from 98 to 1 mole percent ethylene glycol residues and from 2 to 99 mole percent residues derived from 1,3- or, preferably, 1,4-cyclohexanedimethanol in which the ethylene glycol and cyclohexanedimethanol residues constitute at least 80 mole percent of the diol residues.

10 Claims, No Drawings

THERMOPLASTIC ARTICLE HAVING HIGH-RELIEF SURFACE

REFERENCE TO RELATED APPLICATION

This application claims the benefit of U.S. Provisional Application Ser. No. 60/057,348, filed Aug. 26, 1997.

FIELD OF THE INVENTION

This invention pertains to a novel thermoplastic article having a high-relief, molded or embossed surface. More specifically, this invention pertains to an article produced by contacting a laminate comprising a first or outer sheet material and a second or backing layer with a heated element under pressure whereby the layers simultaneously are fused to each other or to other layers that are contained within the laminate and a high-relief, molded or embossed surface is created on at least one of the outer sheets. The embossment or shaped/molded surface may be slight so as to provide a matte or satin finish but preferably the relief of the shaped surface is severe so as to present on the surface a decorative image. The novel thermoplastic articles provided by the present invention may be used in the construction industry as glazing for windows, in partitions and as decorative panels.

BACKGROUND OF THE INVENTION

Glass, both transparent and translucent, has been used as glazing material for windows and partitions and, for certain uses, it is painted or stained to provide specific decorative effects. Glass is high in density and weight, is difficult to fabricate at the work site, is generally brittle, and can constitute a safety hazard.

Glass substitutes such as polyvinyl chloride sheeting, acrylic, e.g., poly(methyl methacrylate), sheeting and polycarbonate sheeting have been used as substitutes for glass in certain glazing applications. Generally, these substitutes are made for clear (transparent), non-decorative applications. The sheet material provided by this invention may be used primarily for producing or obtaining decorative applications with varying degrees of transparency and various levels of enhanced security.

SUMMARY OF THE INVENTION

The present invention provides a thermoplastic article, typically in the form of sheet material, having a high-relief, molded or embossed surface. The thermoplastic article is obtained by contacting a laminate or "sandwich" comprising a first or outer sheet material and a second or backing sheet material with heat using a heated element which simultaneously causes one surface of the thermoplastic article to be molded or embossed, for example, with a decorative image or design. Additional sheets of thermoplastic material may be included between the two outer sheets in order to increase the overall thickness of the laminate. The first and second sheet materials are produced from certain copolyesters containing repeating units of terephthalic acid residues, ethylene glycol residues and cyclohexanedimethanol residues. Any additional sheets typically will be composed of the same materials that are used to prepare the outer two sheets. Thus, the present invention comprises a thermoplastic article having a high-relief, molded or embossed surface obtained by contacting a laminate comprising a first sheet material and a second sheet material with a suitable mold with heat and pressure using a heated element which results in the simultaneous bonding of the sheet material and the production of a decorative texture or design on the surface of at least one of the sheets; wherein the first and second sheet materials are formed from a copolyester having an inherent viscosity of 0.5 to 1.2 dL/g, when measured at 25° C. using 0.50 grams of polymer per 100 mL of a solvent consisting of 60 weight percent phenol and 40 weight percent tetrachloroethane, comprising:

(i) diacid residues comprising at least 80 mole percent terephthalic acid residues; and (ii) diol residues comprising from 98 to 1 mole percent ethylene glycol residues and from 2 to 99 mole percent residues derived from 1,3- or, preferably, 1,4-cyclohexanedimethanol in which the ethylene glycol and cyclohexanedimethanol residues constitute at least 80 mole percent of the diol residues.

A second embodiment of the present invention comprises an high-relief, molded or embossed, bonded laminate comprising, in order, (1) a first or outer copolyester layer, (2) a second layer comprising a film which is colored or which bears an image or pattern, and (3) a third or backing copolyester layer, wherein the first and third layers are composed on the above-described copolyester. Additional sheets which may be used to increase the thickness of the laminate may be prepared from the above-described copolyester. The relief of the molded or embossed surface of the termoplastic articles and laminates of the present invention may be up to about 13 mm and preferably is about 0.25 to 13 mm and most preferably is about 5 to 13 mm.

DETAILED DESCRIPTION OF THE INVENTION

The copolyesters which comprise the thermoplastic article of the present invention are known compositions of matter. One of these copolyesters is commercially available from Eastman Chemical Company as PETG Copolyester. These copolyesters comprise repeating units of diacid residues and diol residues. At least 80 mole percent of the diacid residues are terephthalic acid residues. The diacid component of the copolyesters optionally may comprise up to 20 mole percent of one or more other dicarboxylic acid such that the sum of the dicarboxylic acid units is equal to 100 mol percent. Examples of such other dicarboxylic acids include phthalic acid, isophthalic acid, 1,4-, 1,5-, 2,6- or 2,7-naphthalenedicarboxylic acid, 1,3- or 1,4-cyclohexanedicarboxylic acid (which may be cis, trans or a mixture thereof), cyclohexanediacetic acid, trans-4,4'-stilbenedicarboxylic acid, 4,4'-oxydibenzoic acid, 3,3'- and 4,4'-bi-phenyldicarboxylic acids and aliphatic dicarboxylic acids such as malonic, succinic, glutaric, adipic, pimelic, suberic, azelaic, sebacic, nonane, decane, and dodecanedicarboxylic acids. The "residue" of the dicarboxylic acids described herein is that portion of the diacid which constitutes a portion of a diester of the diacid. The diacid residues may be derived from the dicarboxylic acid, dialkyl esters thereof, e.g., dimethyl terephthalate and bis(2-hydroxyethyl) terephthalate, acid chlorides thereof and, in some cases, anhydrides thereof.

The diol component of the copolyesters comprises from 98 to 1 mole percent ethylene glycol residues and 2 to 99 mol percent 1,3-cyclohexanedimethanol and/or 1,4-cyclohexanedimethanol. Up to 20 mole percent of the diol component may be made up of the residues of one or more diols other than ethylene glycol and cyclohexanedimethanol such that the sum of all diol residues is 100 mole percent. Examples of such additional diols include cycloaliphatic diols having 3 to 16 carbon atoms and aliphatic diols having 3 to 12 carbon atoms. Specific examples of such other diols include 1,2-propanediol, 1,3-propanediol, neopentyl glycol, 1,4-butanediol, 1,5-pentanediol, 1,6-hexanediol, 2,2,4,4-tetramethyl-1,3-cyclobutanediol (trans-, cis- or mixtures thereof), and p-xylene glycol. The copolyesters also may be modified with minor amounts of polyethylene glycols or polytetramethylene glycols to enhance elastomeric behavior, e.g., polyethylene glycols and polytetramethylene glycols having weight average molecular weights in the range of about 500 to 2000. The diol component of the copolyesters preferably consists essentially of residues of ethylene glycol and 1,4-cyclohexanedimethanol wherein the mole ratio of ethylene glycol residues:1,4-cyclohexanedimethanol residues is about 10:90 to about 90:10, most preferably about 60:40 to about 80:20.

The copolyesters have an inherent viscosity in the range of 0.5 to 1.2 dL/g when measured at 25° C. using 0.50 grams of polymer per 100 ml of a solvent which consists of 60% by weight phenol and 40% by weight tetrachloroethane. The copolyesters utilized in the thermoplastic article of the present invention preferably have an inherent viscosity of 0.6 to 0.9 dL/g (measured as described herein) and, most preferably, consist of terephthalic acid residues, ethylene glycol residues, and 1,4-cyclohexanedimethanol residues.

The copolyesters useful in the present invention may be prepared by conventional polycondensation procedures well-known in the art. Such processes include direct condensation of the dicarboxylic acid(s) with the diols or by ester interchange using a dialkyl or diaryl dicarboxylate. For example, a dialkyl terephthalate, e.g., dimethyl terephthalate or bis(2-hydroxyethyl) terephthalate, or a diaryl ester such as diphenyl terephthalate is ester interchanged with the diols at elevated temperatures in the presence of a polycondensation catalyst.

In the novel laminates of this invention, the second layer is a film which is colored or bears an image or pattern to produce a predetermined decorative effect. This second layer film can be composed of any suitable polymeric material that is compatible with the copolyester materials used for the outer layer and the backing layer, inks, and other materials used in fabricating the solid surface. Preferably, the film comprises a polycarbonate, polyvinyl chloride (PVC), acrylic, or the above described copolyester.

The second layer film preferably has a thickness of about 0.025 to 0.750 mm (about 0.001 to 0.030 inch) more preferably about 0.0125 to 0.500 mm (about 0.0005 to 0.020 inch) and most preferably about 0.250 mm (0.010 inch) in thickness. However, polymeric films thinner or thicker can be used depending on the equipment available, and under such conditions the thickness is limited only by functionality. The film should not be distorted or opacified during the process of bonding the laminate. The bonds between the film layer and the outer and backing layer should be strong enough so that there is not delamination upon use.

The thermoplastic articles and laminates of our invention can be used in the manufacture of decorative walls, partitions, and glazing applications. The thermoplastic articles and laminates are thermoformable according to methods known in the art of thermoforming.

The outer and backing sheet materials, as well as any interior sheets, used in the manufacture of the thermoplastic articles of the present invention may be the same or different. For example, the outer and backing sheet materials may be produced from different copolyesters (as defined herein) or copolyester compositions which contain different additives, e.g., pigment additives which alter the transparency of the copolyester sheeting. The sheet material used in the preparation of the thermoplastic articles of our invention may be transparent, translucent, or one layer may be opaque, depending on the particular aesthetic effect desired. The outer and backing sheet materials may differ in degree of transparency or translucency and also in color. When the outer and backing sheet materials are produced from different copolyesters, the copolyesters must be thermally compatible. Furthermore, the polymeric film utilized in the laminates of our invention also must be compatible with the copolyester(s) utilized in the outer and backing layers. As used herein, the term "thermal compatibility" means that when layers of the sheet materials are bonded together or with the film layer under conditions of elevated temperature and pressure, the layers undergo approximately equal thermal expansion or contraction such that the thermoplastic article or laminate is substantially planar.

The thermoplastic article of the present invention may be produced by subjecting a sandwich comprising a first or outer sheet material and a second or backing sheet material to temperatures and pressures sufficient to cause the first and second sheet materials to bond (or fuse) to each other. However, temperatures which cause decomposition, distortion, or other undesirable effects in the finished article or sheet material should be avoided. Normally, the bonding temperatures are in the range of about 90 to 300° C. (194 to 572° F.), preferably in the range of about 129 to 260° C. (264 to 500° F.). The pressures utilized in the bonding or laminating of the sandwich preferably are in the range of about 0.65 to 3.45 MPa (about 95 to 500 pounds per square inch—psi). The optimal temperature for bonding the thermoplastic articles will vary depending, for example, on the particular copolyester(s) employed and the thickness of the sheet materials used, and may be determined by those skilled in the art. The sandwich or laminate is held at the appropriate temperature and pressure for about 4 to 24 minutes, or until such time as a bond is formed between the upper and lower sheet materials. After 4 to 24 minutes, the bonded/fused thermoplastic article is allowed to cool under pressures from about 0.69 to 2.4 MPa (about 100 to 350 psi), preferably about 1.4 MPa (200 psi), until it cools below the glass transition temperature of the copolyester sheet material(s). During the bonding process, the copolyester sheet materials may be bonded or fused to each other without the use of an adhesive.

In the bonding process used to prepare the thermoplastic articles and laminates of this invention, a thin plastic film or paper that has a melting or softening point higher than that of one or both of the upper and lower sheet materials to be laminated is placed adjacent to and on the outside of the structure to be laminated. This film or paper may be either smooth or possess a pattern(s) to produce the embossed surface which is an essential feature of the present invention. Over this film/paper is placed a flexible metal plate having a thickness of 0.51–3.56 mm (0.020–0.140 inch). A fabric pad about 6.4 mm (0.25 inch) thick may be placed over the plate. This fabric pad can be composed of a variety of materials such as a silicone material or Nomex® and can contain copper wire to promote heat transfer. The primary purpose of the pad is to equalize the pressure to the metal plate which it covers. Alternatively, a mold may be placed between the flexible metal plate and the film/paper in contact with the laminate surface. The mold may be textured or bear an image or pattern which is transferred to the thermoplastic article or laminate, providing the high relief embossed surface. The material then is placed in a press and the temperature is raised until the temperature of the material to be laminated is between about 90 to 140° C. (about 194 to 284° F.). This operation can be performed either with or without a vacuum press. Generally, the occurrence of bubbles in the final thermoplastic article produced is less likely to occur if the air is evacuated prior to applying heat and pressure. The pressure on the sandwich/laminate is increased to between 0.55 to 1.4 MPa (about 40 to 200 psi) with a pressure of 1.24 MPa (180 psi) being preferred. As a result of pressure and heat, the sheets of copolyester are fused together. The laminates of the invention are prepared in a manner analogous to the bonding process used in the manufacture of the thermoplastic articles.

When vacuum is applied during the lamination process, the pressure requirements are reduced significantly, e.g., from 1.72 MPa (about 250 psi) to 1.03 MPa (about 150 psi). It is desirable to maintain the pressure on the laminate/sandwich until the temperature of the resulting thermoplastic article decreases to a temperature less than the glass transition temperature of the copolyester. Then the fused thermoplastic article containing the fabric is removed from the press.

It may be possible to use lower temperatures, pressures and/or bonding times in the bonding process by the application of an adhesive material between the sheet materials, or sheet materials and intermediate film, to be bonded. HD2001 polyurethane dispersion (C.L. Hautheway & Sons, Inc.; Lynn, Mass.) is an example of an adhesive which may be used in the bonding process. Similar adhesive dispersions that may be used are available from Bostic (Middleton, Mass.) and Stahl USA (Peabody, Mass.).

The copolyesters constituting the sheet materials used in the manufacture of the articles and sheeting of the present invention may not be as hard or scratch resistant as may be necessary or desired for certain end uses. For example, an end use in which the exterior surface of the thermoplastic article may be subjected to scratching or abrasion, i.e., in a privacy partition, may require the application of an abrasion-resistant, transparent coating (hardcoat) to one or both of the exterior surfaces of the article. For example, films consisting of flourinated hydrocarbon, poly(perfluoroethylene) such as TEDLAR from duPont Chemical Company or oriented poly(ethylene terephthalate) such as MYLAR from duPont Chemical Company) may be used to improve both chemical and abrasion resistance. The abrasion resistant film typically has a thickness in the range of about 0.025 to 0.254 mm (0.001–0.01 inch), preferably about 0.051 to 0.178 mm (0.002–0.007 inch), and most preferably about 0.076 mm (0.003 inch). However, abrasion resistant film thinner or thicker than these ranges may be used since the thickness of such film is limited only by the equipment available, cost and functionality considerations. An adhesive optionally may be used between the copolyester and the abrasion resistant film.

Alternatively, an abrasion resistant coating may be applied to a plastic film and then the film bearing the abrasion resistant coating may be laminated to one or both sides of the article or sheeting of the present invention. The film may be selected from a number of thermoplastic materials compatible with the lamination process such as poly(vinyl chloride), PETG copolyester, poly(ethylene terephthalate), poly(methyl methacrylate), polycarbonate and similar materials. The film thickness may range from 0.025–0.381 mm (0.001–0.015 inch) with a thickness of 0.0762–0.203 mm (0.003–0.008 inch) being most preferred. The coating may be selected from a number of commercially-available materials such as polyurethanes, fluorinated polyurethanes and silicones which are cured by heat or they may be selected from materials that are cured by ultraviolet (UV) or electron beam (EB) radiation. Such UV/EB cured materials fall under the general class of acrylates and modified acrylates that contain fluorine, silicone, epoxy, polyester, polyether or caprolactone residues or functional groups. The particular coating material selected will depend primarily on the degree of abrasion resistance required. Application of the liquid, heat- or UV/EB-curable precursor of the abrasion resistant coating may be carried out according to conventional procedures and usually is accomplished on a roll coating machine. The thickness of the coating applied to a film generally is 0.0076–0.051 mm (0.0003–0.002 inch) with thickness of about 0.0127 mm (0.0005 inch) being most preferred.

These coating may be applied in a manner similar to the application of paints. The coatings exist either as predominantly undiluted materials with very little volatile content or as solvent- or water-based materials. In addition to being applied to a film that can be laminated to the structure as part of the process, they may be applied directly to the finished product. Application may be carried out by a variety of techniques such as roll, paint, spray, mist, dip and the like.

After the thermoplastic article has cooled to a temperature below the glass transition temperature of the copolyester during the manufacture of the article, it can be shaped and thermoformed into a variety of useful products. As an illustrative example, the thermoplastic article can be thermoformed or otherwise shaped into storm doors, storm windows, sliding glass doors, shower doors, entrance doors, privacy partitions, stained glass windows, and table tops. The thermoplastic articles of this invention have an appealing appearance with low density to facilitate transport and installation of building materials produced therefrom.

The invention has been described in detail with particular reference to preferred embodiments thereof, but it will be understood that variations and modifications can be effected within the spirit and scope of the invention.

We claim:

1. A thermoplastic article having a high-relief, molded or embossed surface obtained by contacting a laminate comprising a first sheet material and a second sheet material with heat and pressure using a heated element which results in the simultaneous bonding of the sheet material and the production of a decorative texture or design on the surface of at least one of the sheets;

wherein the first and second sheet materials are formed from a copolyester having an inherent viscosity of 0.5 to 1.2 dL/g, when measured at 25° C. using 0.50 grams of polymer per 100 mL of a solvent consisting of 60 weight percent phenol and 40 weight percent tetrachloroethane, comprising:

(i) diacid residues comprising at least 80 mole percent terephthalic acid residues; and (ii) diol residues comprising from 98 to 1 mole percent ethylene glycol residues and from 2 to 99 mole percent residues derived from 1,3- or, 1,4-cyclohexanedimethanol in which the ethylene glycol and cyclohexanedimethanol residues constitute at least 80 mole percent of the diol residues.

2. A thermoplastic article according to claim 1 wherein the upper and lower sheet materials have a thickness in the range of about 0.76 to 6.4 mm and the relief of the decorative texture or design is about 0.25 to 13 mm.

3. A thermoplastic article according to claim 1 wherein the upper sheet material has a thickness in the range of about 0.4 to 3.2 mm, the mole ratio of ethylene glycol residues:1,4-cyclohexanedimethanol residues is about 60:40 to about 80:20, and the copolyester has an inherent viscosity of 0.6 to 0.9 dL/g, when measured at 25° C. using 0.50 grams of polymer per 100 mL of a solvent consisting of 60 weight percent phenol and 40 weight percent tetrachloroethane and the relief of the decorative texture or design is about 5 to 13 mm.

4. A thermoplastic article according to claim 3 wherein the article includes an abrasion-resistant coating on one or both of the outside surfaces of the article.

5. A thermoplastic article according to claim 4 wherein the abrasion resistant coating is provided as a film having a thickness in the range of about 0.0127 to 0.254 mm.

6. A thermoplastic article according to claim 4 wherein the abrasion resistant film is provided as a fluorinated hydrocarbon, poly(perfluoroethylene), acrylic or oriented poly(ethylene terephthalate) film having a thickness in the range of about 0.0127 to 0.254 mm.

7. A thermoplastic article according to claim 4 wherein the abrasion resistant coating is a heat-, ultraviolet- or electron beam-cured material on a film of poly(vinyl chloride), PETG copolyester, poly(ethylene terephthalate), poly (methyl methacrylate) or polycarbonate.

8. A thermoplastic article according to claim 6 wherein the film has a thickness of 0.0127 to 0.254 mm.

9. A thermoplastic article according to claim 7 wherein the abrasion resistant coating is a heat-cured silicone, polyurethane or fluorinated polyurethane or a ultraviolet- or electron beam-cured material selected from modified acrylates containing polyurethane, fluorinated polyurethane, silicone, epoxy, polyester, polyether or caprolactone residues.

10. A thermoplastic article according to claim 2 wherein the upper sheet material is transparent and the lower sheet material is translucent or opaque.

* * * * *

UNITED STATES PATENT AND TRADEMARK OFFICE
CERTIFICATE OF CORRECTION

PATENT NO.　: 6,025,069
DATED　　　 : February 15, 2000
INVENTOR(S) : Michael Dennis Eckart and Raymond Lynn Goodson It is certified that error appears in the above-identified patent and that said Letters Patent is hereby corrected as shown below:

Column 5, line 5, "(about 40 to 200psi)" should read --(about 80 to 200psi)--

Signed and Sealed this

Fifth Day of December, 2000

Attest:

Q. TODD DICKINSON

Attesting Officer　　　　　　　Director of Patents and Trademarks